Oct. 24, 1950          G. B. LITCHFORD         2,526,675

ANTENNA STRUCTURE

Filed April 28, 1945                                            2 Sheets-Sheet 1

INVENTOR
GEORGE B. LITCHFORD
BY
ATTORNEY

Oct. 24, 1950 G. B. LITCHFORD 2,526,675
ANTENNA STRUCTURE
Filed April 28, 1945 2 Sheets-Sheet 2
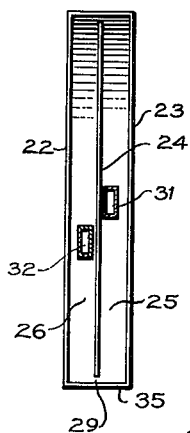
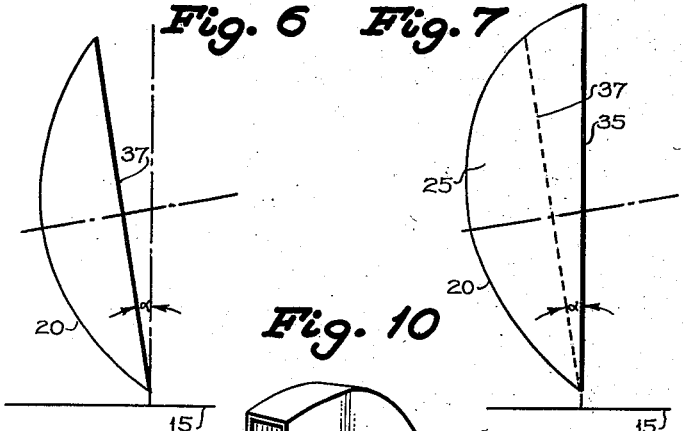
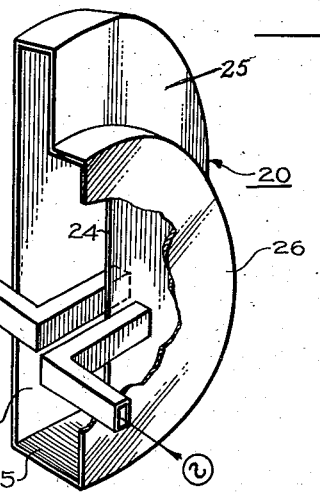
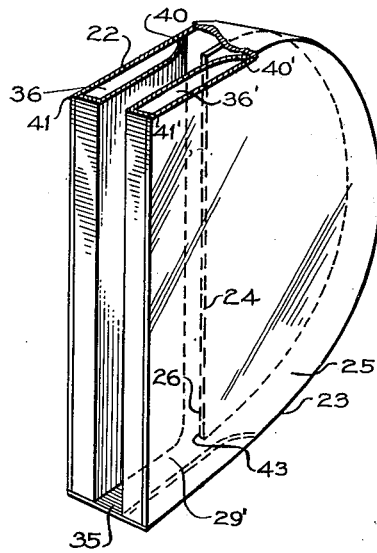
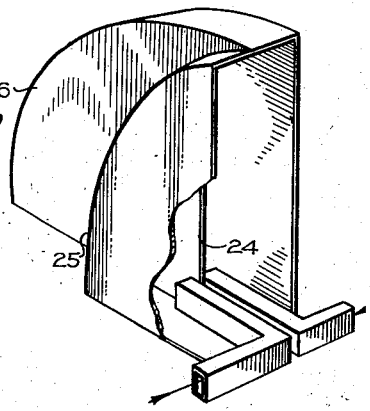
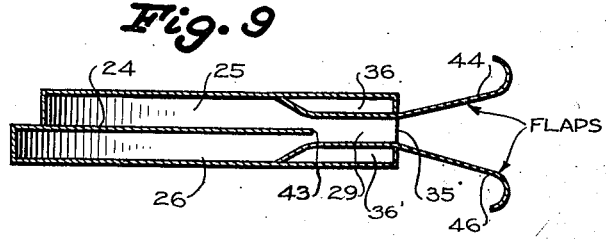
INVENTOR
GEORGE B. LITCHFORD
BY
Paul B. Hunter,
ATTORNEY Patented Oct. 24, 1950

2,526,675

UNITED STATES PATENT OFFICE 2,526,675

ANTENNA STRUCTURE

George B. Litchford, Huntington, N. Y., assignor to The Sperry Corporation, a corporation of Delaware Application April 28, 1945, Serial No. 590,875

10 Claims. (Cl. 250—33.65)

This invention relates generally to electromagnetic wave energy radiating devices, and more particularly, to apparatus including directive antennae utilized in systems for defining a course for radio range and/or instrument landing purposes.

While the present invention may be employed in any system requiring a sharply defined path of electromagnetic energy, as for radio range purposes, in its preferred embodiment, the invention will be described as used for directionally defining a glide path in a radio instrument landing system, but it will be understood that the true scope of the invention is indicated rather by the claims.

One of the more important limitations held against presently known glide path systems results from the fact that a pilot in an aircraft utilizing such a system for landing purposes, may receive improper false or inverse course indications on the aircraft's indicator due to minor lobe radiation patterns emitted from the radiators used in defining the glide path and is thus unable to differentiate between these indications and true signals representative of the true glide path.

The foregoing problem has been overcome in a satisfactory manner in the present improved system by providing radiation patterns composed of two separately controllable, nonsymmetrical beams of electromagnetic energy, one beam having a radiation pattern attributable to a warped parabolic radiator, or as in the preferred embodiment to a cosecant square radiator, which propagates or directs a beam of electromagnetic energy in a sharply extending manner from the horizontal terrain at an angle of approximately 60° and tapers off at about 3° above the horizon to maintain a constant height above the terrain.

This beam is directed so as to lie above, or be superposed on the second beam of electromagnetic energy which is propagated by a radiator of the usual or normal parabolic type.

In the formation of such a glide path the upper and lower beams of the glide path are capable of each being treated separately, and the formation of one beam can be accomplished without effecting the other beam of the pair. This is done by having two separate cylindrical portions of the reflector, with the apertures thereof opening into a common section and finally into a common aperture.

In this combined radiation pattern, all spurious or minor lobes of electromagnetic energy are completely encompassed by and contained within the cosecant square radiation pattern, obviating the possibility of false or inverse glide path courses.

It is necessary, however, that the azimuthal plane of the two radiated beams of energy utilized be coincident if it is desired that an airplane land at large azimuth angles with respect to the axis of the concave reflector. The two beams, therefore, must be propagated so as to coincide in azimuth at all times.

By using a single aperture for directing both upper and lower beams the control of both beams in the azimuthal plane with their consequent agreement and coincidence in this plane, is made possible. It follows, therefore, that the two radiated patterns although differing in their elevational plane maintain a constant coincidental azimuthal pattern.

The novel radiating system herein described provides these desired highly advantageous electromagnetic radio energy patterns and fulfill all the aforestated requirements. This novel antenna system constructed and operated satisfactorily, comprises a concave reflector, radiator or transducer having an electrical conductive partition, or septum, extending perpendicularly from the concave surface of the reflector so as to divide a portion of the reflector into two sections, one propagating a cosecant squared directivity characteristic or any other desired warped directivity characteristic and the other a normal parabolic characteristic. The dividing partition or septum is not extended across the entire radiator longitudinally, but allows a substantial portion thereof to be used as a common emitter portion or mouth for the divided sections of the reflector. The result thereof is to provide a common emission characteristic in the azimuthal plane, yet to allow for varying vertical propagation of the two beam patterns.

This is in great contradistinction to all previously known systems where in order to obtain a deformed upper beam and an undeformed lower beam, it is necessary to use two separate radiators with the consequent inutility of these radiators in applications where it is necessary to land an airplane at large azimuthal angles because with these radiators the azimuth patterns are unable to agree, due to the proximity of the antennas, and because minor lobes radiated from such antennas or radiators do not agree at large azimuth angles.

It is an object of the present invention, therefore, to provide an antenna system overcoming the foregoing disadvantages.

A further object is to provide improved radiators for use in glide paths, or radio range beam systems.

Another object is to provide means for forming two separately spaced beams from a single concave reflector in an improved manner.

Yet, another object is to provide an improved glide path radiating system.

Still another object is to provide novel electromagnetic wave energy radiating arrangements providing reliable beam angle control.

Another object is to provide a novel glide path radiating system obviating the presence of false or inverse courses.

A further object of the invention is to provide improved apparatus and instrumentalities adapted for use in realizing the above objects and also adapted for use in other fields.

Further objects of the invention will appear as the description proceeds in connection with the annexed claims and the appended drawings wherein:

Figs. 3, 4 and 5 are perspective, side and front views, respectively, of an antenna or radiator array useful in producing a pattern of the type shown in Figs. 1 and 2;

Figs. 6 and 7 are diagrammatic views illustrating two methods of directing the radiator or antenna structure, shown in Fig. 3, to obtain the desired glide path pattern shown in Fig. 1;

Fig. 8 is a side view in perspective with portions broken away to illustrate a modification of the radiator represented in Fig. 3;

Fig. 9 is a sectional view of the device illustrated in Fig. 8, showing the added feature of directing flaps utilized therewith;

Fig. 10 is a substantially perspective view, with parts broken away, of a modification of the transmitter-reflector device illustrated in Fig. 3; and Fig. 11 is a substantially perspective view, with parts broken away, or another form of the transmitter reflector shown in Fig. 3, adapted to provide the radiation pattern shown in Fig. 1.

Figure 1:
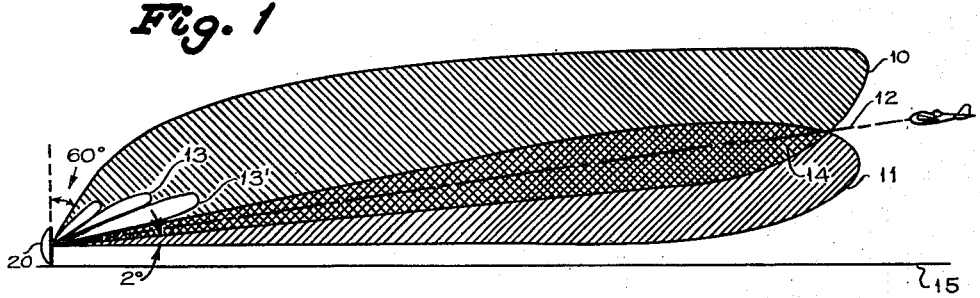
Fig. 1 is a polar coordinate curve representing the vertical field strength pattern defining a glide path.

The present invention contemplates apparatus defined to propagate or form two closely adjacent superposed dissimilar beams of electromagnetic energy 10 and 11 defining a glide path 12 which is normally positioned at an angle of approximately 2½° from the landing area 15.

The upper of said pair of beams 10 is distorted in such a way that it rises rapidly from zero at the ground level to a maximum at about 3° above the horizon and tails off gradually from the top side until an angle of about 60° is reached. The minor lobes 13 and 13', associated with the directed beams 10 and 11, are substantially absorbed within the upper beam of electromagnetic energy 10 and their effects thus nullified.

Figure 2:
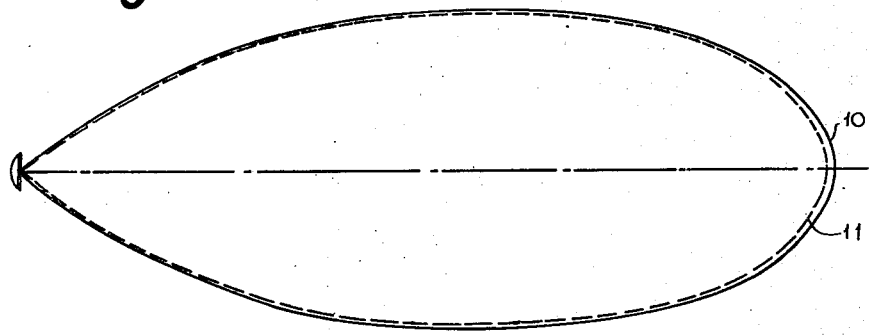
Fig. 2 is a plan view of the azimuthal pattern of the same glide path.

The requisite beam pattern is represented as in Figs. 1 and 2, and is designed to give a constant intensity received signal in an airplane flying towards the antenna at a predetermined constant altitude above flat terrain. The desired wide azimuthal pattern obtainable through the use of the present invention is represented as in Fig. 2, where the coincidence of both superposed beams 10 and 11 is established in a wide azimuthal plane.

The reflector 20 described in the present invention is formed with a curved or concaved rejection surface 21 facing in the direction desired to direct the beams of electromagnetic energy.

Figure 3:
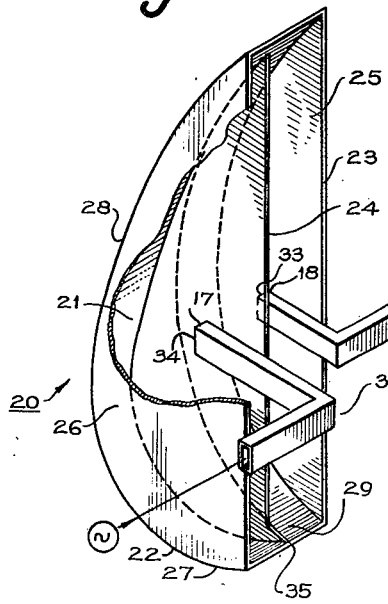

As illustrated in Fig. 3, reflecting surface 21 is relatively narrow and is provided with substantially narrow, internally flat conductive side wall assemblies 22 and 23. Reflector 20 is parabolic in nature and is split or divided in longitudinal direction by a septum or conductive partition or wall assembly 24, so as to comprise in essence two dissimilarly configured cylindrical parabolic narrow sections 25 and 26.

Section 25 is concave in the normal parabolic manner and second section 26 is essentially a parabola having a lower portion 27 warped in such a manner as to be enabled to emit a radiation characteristic or pattern 10, in which the signal strength at an angle $\theta$ away from the peak of the radiated beam 10, is proportional to a constant multiple of the cosecant of the angle. Thus, section 26 is known to persons skilled in the art as a cosecant square director, and is formed by having a top portion 28 constructed according to a normal parabolic plot and its remaining lower portion warped to describe a quarter arc of a circle, and satisfies the above set forth emission or radiation criteria.

Since reflector sections 25 and 26 are dissimilarly configured, wave guides or electrical conduits 31, 32 which function to transmit electromagnetic energy to the respective reflector sections 25 and 26 are positioned at different focal points or foci 33, 34 adjacent to conductive partition or wall 24.

Figure 4:
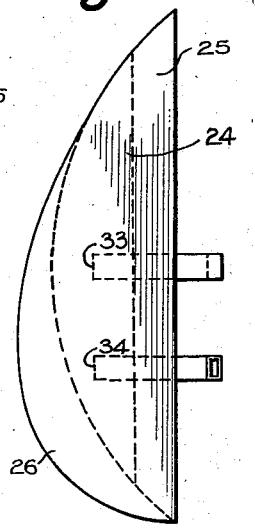

As seen in Fig. 3 and more particularly in Figs. 4 and 5, sections 25 and 26 have their respective foci 33, 34 dissimilarly positioned in accordance with the respective configuration of their respective reflective sections so that section 25, which is a normal parabolic reflector, will have its focal point 33 raised above the focal point 34 of section 26, the cosecant square radiator section.

Wave guides 31 and 32, feeding electromagnetic energy to respective sections 25 and 26 at focal points 33, 34, will in turn be offset from each other, adjacent conductive partition 24. It therefore follows, that the focal lengths for each of the individual radiating sections 25, 26 are also dissimilar in length.

The two sections 25 and 26 of the concave reflector 20 have as a common wall a septum or conductive partition 24, which extends from the concave surface 21 in a plane perpendicular to the directrices of the parabolic concave surface 21, or in a plane parallel and adjacent to such a plane. The conductive partition 24 extends thus longitudinally from the back of said reflector 21, for only a portion therealong, and allows a substantial portion 29 of the reflector 20 to be common to both sections 25 and 26, and allows sections 25 and 26, to radiate from a common section mouth and/or aperture 35.

In apparatus which has been satisfactorily constructed and operated, excellent results have been attained from the use of a concave reflector 20, constructed from sheets of copper and having a common aperture or discharge diameter 35 of approximately 3¼", with the reflector sections 25 and 26 each having a diameter of 1½"; and having dissimilar focal lengths of 57⁄8" and 43¼".

Electromagnetic wave energy is supplied to sections 25 and 26 from suitable ultra high frequency sources designated as at 30 by means of substantially coextensive wave guides or similar conduits 31, 32 having discharge mouths or exit portions 17, 18 facing reflecting surface 21 and located preferably at the foci 33, 34 of the two dissimilar cylindrical sections 25 and 26 adjacent to the dividing partition 24.

Convenient and suitable supports are, of course, provided for mounting wave guides 31 and 32 in association with reflector surface 21, but since these supports are unimportant to this embodiment of the invention, further description or illustration thereof is deemed to be unnecessary.

In accordance with known radiation theory concerning the propagation of electromagnetic energy from parabolic or concave reflectors, a collimated or directed beam of electromagnetic energy, such as is represented by either 10 or 11 in Fig. 1, is reflected from each of the dissimilarly configured reflectors or radiating sections 25, 26 in accordance with the concavity of the respective reflective surfaces, and the entry position of the electromagnetic energy feeders with respect to the separate foci of radiators 25, 26.

For example, the beam of energy directed by section 25 of radiator 20 will be as shown at 11 in Fig. 1 and is accordingly seen to be represented by the usual type of directed electromagnetic beam of energy reflected from a cylindrical parabolic reflector; while the beam of energy propagated from the warped reflector-radiator section 26 is a beam of electromagnetic energy forming or shaping a directivity pattern known to those skilled in the art as a cosecant squared radiation pattern, and is represented as at 10 in Fig. 1.

Thus the separate radiator sections 25 and 26 each separately control or define respective vertical beams of electromagnetic energy 10 and 11. These respective beams of energy 10, 11 are directed by the separate reflector sections 25, 26 of the radiator 20 which are formed, as discussed previously, by common conductive partition or wall 24 and side wall assemblies 22, 23.

At the end of the common wall or conductive partition 24, beams 10 and 11 are directed into a joint radiator section 29, section 29 being common to both sections 25 and 26 and for a substantial portion of radiator 20. In common or joint radiator-section 29, the individual wave fronts of beams 10 and 11 are combined so that when beams 10, 11 emerge from mouth 35 of the common section 29, a common wave front is presented, said wave front being maintained in azimuthal coincidence in a horizontal plane.

There is therefore radiated from mouth 35 of radiator 20, two separately controllable vertical beams of electromagnetic energy 10, 11 coincident at all times in a desired azimuthal plane.

It is believed that the combination or merger of the separate beams of electromagnetic energy 10, 11 in the azimuthal plane is due to a combination of the individual wave fronts of the separate beams 10, 11, within the common radiator section 29, which, when sufficient distance is allowed, effectively combines both beams and directs them in much the same manner as an individual beam having a common wave front.

Thus the extent of the cut-back area or common mouth portion 29 is, of a necessity, a substantial portion of radiator 20 and its length depends upon the distance necessary for the effective merger of the individual beams of energy 10, 11 emitted from the respective radiator sections 25, 26 proceeding along a common conduit or mouth section 29.

To produce the desired glide path 12, directive beams 10 and 11 are so radiated that a part of each is overlapped by a portion of the other. The overlapped section 14 provides a path in space which is defined by both beams being of equal magnitude. Beams 10 and 11 are usually modulated or otherwise distinguished so as to be defined or recognizable by a suitable indicator in an airplane. For example, in the system utilizing the present novel radiator 20, beams 10 and 11 are modulated by means of 900 cycle and 600 cycle per second signals, respectively.

When an airplane flies a course down the center of this overlapped area 14, the intensities of the two beams as received on a suitable indicator will be equal and the receiver output will cause an indicator, such as a "cross pointer meter" to indicate an "on-path" condition.

If the plane flies a course which is above the correct glide path 12, the received intensity of the upper beam 10 will be greater than that received from the lower beam 11, and the indication on said meter will be to "fly down." Inversely, if the plane flies below the correct glide path, the intensity of the lower beam 11 will be greater than the upper beam 10 with the result that an indication will be received to "fly up."

Figure 3A:
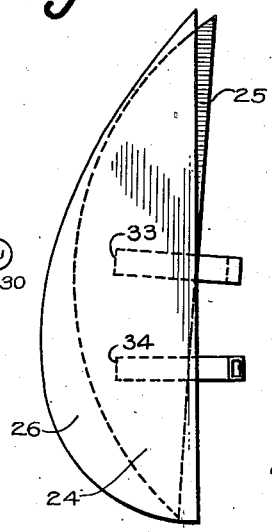
Fig. 3A is a side view of the antenna array showing one portion of the antenna tilted with respect to another portion of the same antenna array.

In order to define the overlapped area 14 and to direct the vertical overlap of beams 10 and 11 with respect to each other, sections 25 and 26 of radiator assembly 20 are tilted with respect to each other in somewhat the fashion as indicated in Fig. 3A.

In Fig. 3A sections 25 and 26 of reflector 20 are shown tilted or angularly deviated with respect to each other at an angle of approximately 2°. The respective sections 25 and 26, as previously, feed into a common section 29 but the overlap angle between beams 10, 11 which is, now, dependent upon the tilt of section 25 with respect to section 26, gives the desired overlap section 14 defining the constant intensity section of the glide path 12 as described.

Once the desired overlap section 14 is accomplished, the angular disposition of the glide path 12 formed by the aforesaid overlapped section 14, may be directed with respect to a landing area 15 by tilting or positioning radiator assembly 20 as is shown in Figs. 6 and 7.

Thus, in order to direct the combined radiated beams of electromagnetic energy 10 and 11 after they have been overlapped, and to determine the angle $\alpha$ of the glide path 12 with respect to the landing area 15, radiator assembly 20 is tilted with respect to the landing area 15; the combined beams 10, 11 are then directed as desired.

As is shown in Figs. 6 and 7, there are various methods used in directing the combined radiation patterns propagated by radiator assembly 20.

If it is desired that the mouth portion 35 of radiator 20 be maintained in constant vertical relationship with the landing area 15, the radiator assembly 20 may be constructed as is shown in Fig. 7, where the latus rectum 37 of the parabola or concave reflector assembly 20 forms the desired glide path angle $\alpha$ with terminus or mouth portion 35 of radiator 20; the aforesaid mouth 35 thus maintaining its vertical position with respect to ground area 15. If desired, however, the entire antenna structure 20 may be rotated, as in Fig. 6, to the desired tilt angle $\alpha$ defining the angle of the glide path 12 with respect to the landing area 15.

In Fig. 8, there is represented a modification of the devices, shown in Fig. 3 in which, to preclude any possibility for azimuth beam shift, tapered sections 36 and 36' are introduced adjacent the walls 22, 23 of the concave reflector 20 in the common section 29 of the radiator 20. These tapered sections or concentrators 36, 36' constrict the aperture or common mouth portion 29, and although are shown to be rigidly affixed to walls 22, 23 as at points 40, 40', 41, 41', they may be dismountable or removable and are merely shown as in an illustrative sense.

The action of concentrators 36, 36' are twofold. First, by decreasing the aperture width of common section 29, spurious modes propagated along the common mouth portion 29 of the reflector 20 are attenuated rapidly. Secondly, the restricted portion 29' now acts somewhat in the nature of a horn section matching the narrow section 29' to a new common section 43 and decreases the amplitude of the spurious modes excited at the end of partition 24.

In Fig. 9 there is further represented a modification of the structure shown in Fig. 8, which modification describes the additional feature of terminating the common aperture 29' utilizing the concentrators 36, 36' by a pair of exponential flaps 44, 44'.

The use of these gradually flaring and continuously curved flaps 44, 44' have been found to considerably reduce secondary lobe formation, for example to such an extent as to gradually improve the operation of aircraft landing systems embodying the same.

It is believed that this advantageous operation is due to the fact that the flap surfaces are free from abrupt electrical discontinuities, and are thus so formed as to transfer the wave energy into space without the introduction of appreciable disturbing reflections. The reduction of such reflections results in substantial elimination of stray, uncontrolled energy which otherwise would tend to interfere with the issuing waves and produce objectional side lobes, and thereby increase the total strength of the utilizable beam in the radiation pattern.

Figs. 10 and 11 are further modifications of applicant's novel device. In Fig. 10 there is represented a reflector 20 having dissimilarly configured radiating sections 25 and 26 feeding into a common aperture section 29. However, section 29 is so dimensioned that a step is now formed between the two dissimilar sections. In Fig. 11 a modification of applicant's device is shown in which half sections of the parabolic radiators 25, 26, represented in Fig. 3, are utilized to obtain the desired beam radiation pattern.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A microwave radiator comprising concave reflector means, a multiplicity of mutually spaced conducting wall assemblies connected to said reflector means and extending therefrom, an intermediate one of said wall assemblies being substantially smaller than the remaining wall assemblies, said one wall assembly thereby partially dividing said radiator into two sections feeding into a common undivided forward portion formed by the others of said wall assemblies and said reflector means, means for feeding electromagnetic energy independently into said sections for passage therefrom and through said common forward portion wherein the energy from the sections intermingle and whereby a common electromagnetic wave front from said sections is presented and maintained in azimuthal coincidence exteriorly of said radiator.

2. Directive antenna means comprising parallel reflector members having portions thereof of differing cross sections, one of said cross sections being substantially parabolic and another portion being substantially partially parabolic and partially circular, flat parallel side walls provided at the curved outer edges of said reflector members and an intermediate partition member parallel with said side walls separating the portions of said reflectors of differing cross section whereby two separate antenna radiating sections are formed, said sections having foci offset from each other, and energy conveying means projecting into said sections for interchanging energy therewith at points substantially coincident with said foci.

3. Directive antenna means adapted for use in instrument landing of aircraft comprising dual electromagnetic radiating means having reflector structures of differing contour and disposed relative to one another so as to produce upper and lower overlapping beams of electromagnetic radiated energy, the reflector structure producing the upper beam being of non-parabolic contour for producing an asymmetrical pattern designed for encompassing minor lobes of radiations thereby to substantially nullify the presence of such lobes, the overlapping portions of said beams providing a uniform intensity signal path for effecting instrument landing.

4. In a microwave radio instrument landing system, means for producing first and second distinctive radio signal energies for transmission from a fixed station, symmetrical curved reflector means coupled thereto for sending forth said first signal energy in a lower directive beam and asymmetrical curved reflector means for sending forth said second signal energy in an upper directive beam partially overlapping with said lower beam and forming an equisignal glide path therewith, said upper beam having an asymmetrical pattern with a steep gradient of signal strength versus angle whereby the effects of minor lobes of said lower beam are minimized.

5. In a radio instrument landing system, means for producing first and second distinctive microwave radio signal energies for transmission from a fixed station, first directive antenna means coupled thereto for sending forth said first signal energy in a lower symmetrical directive beam of maximum intensity in a plane at a very low angle of elevation and second directive antenna means for sending forth said second signal energy in an upper asymmetrical directive beam partially coinciding with said lower beam and forming an equisignal glide path therewith, said first and second directive antenna means being so arranged that the respective angles of elevation of maximum signal intensity of said lower beam and said upper beam are substantially symmetrically displaced below and above said equisignal glide path, and asymmetrical reflector means in said second directive antenna means for producing appreciable transmission of said second radio signal energy throughout a range of angles of elevation extending continuously upward from the angle of elevation of maximum intensity of said upper beam to an angle of elevation appreciably greater than double said angle of elevation of maximum intensity of said upper beam.

6. In a radio instrument landing fixed station system, in combination, means for producing first distinctive radio signal energy and means for producing second distinctive radio signal energy for transmission from the fixed station, directive first antenna and parabolic reflector means coupled to said first energy producing means for concentrating said first signal energy in a lower directive beam of maximum intensity in a plane extending upward from said first directive antenna means at a very low angle of elevation, second antenna and curved reflector means coupled to said second energy producing means for concentrating said second signal energy in an asymmetrical upper directive beam partially coinciding with said lower beam and forming an equisignal glide path therewith, the vertical plane directivity pattern of said second directive antenna means being characterized by a lower region substantially symmetrically related to the upper part of the lower beam, and by an upper part providing appreciable intensity for all angles of elevation up to an angle appreciably higher than twice the angle of elevation of said equisignal glide path.

7. The combination defined in claim 6, wherein both said directive antenna means have a common energy-emitting aperture.

8. In a microwave radio instrument landing fixed station system, in combination, means for producing first radio signal energy for transmission from the fixed station, means for producing second radio signal energy distinctive from said first signal energy for transmission from said fixed station, first directive antenna and symmetrically curved reflector means coupled to said first radio energy producing means for emitting and concentrating said first signal energy in a lower symmetrical beam, second directive antenna and irregularly curved reflector means coupled to said second radio energy producing means for emitting and concentrating said second signal energy in an asymmetrical upper beam, the upper portion of said upper beam being angularly extended for appreciable intensity at all angles of elevation up to an angle of elevation appreciably greater than double the angle of elevation of said glide path.

9. The combination defined in claim 8, wherein said first and second directive antenna means have a common frontal energy-concentrating portion for assuring conformity of the azimuthal energy distributions in the lower and upper beams.

10. An instrument landing antenna system comprising a microwave reflector of parabolic cross section arranged to emit a symmetrical lobe of energy, a second reflector of partially parabolic cross section arranged to emit an unsymmetrical lobe of energy, said reflectors being arranged relative to one another so that the unsymmetrical lobe encompasses substantially all the undesirable minor lobes of the symmetrical lobe, thereby minimizing inverse signals.

GEORGE B. LITCHFORD.

REFERENCES CITED

The following references are of record in the file of this patent:

UNITED STATES PATENTS

| Number | Name | Date |
|---|---|---|
| 2,130,913 | Tolson | Sept. 20, 1938 |
| 2,155,821 | Goldsmith | Apr. 25, 1939 |
| 2,156,653 | Ilberg | May 2, 1939 |
| 2,223,224 | Newhouse | Nov. 26, 1940 |
| 2,241,119 | Dallenbach | May 6, 1941 |
| 2,294,882 | Alford | Sept. 8, 1942 |
| 2,347,180 | Granqvist | Apr. 25, 1944 |
| 2,349,942 | Dallenbach | May 30, 1944 |
| 2,354,254 | Gerhard | July 25, 1944 |
| 2,379,442 | Kandoian | July 3, 1945 |
| 2,407,068 | Fiske et al. | Sept. 3, 1946 |
| 2,407,310 | Lundy et al. | Sept. 10, 1946 |
| 2,436,408 | Tawney | Feb. 24, 1948 |

FOREIGN PATENTS

| Number | Country | Date |
|---|---|---|
| 436,355 | Great Britain | Oct. 9, 1935 |

OTHER REFERENCES

Ser. No. 388,936, Gerhard. (A. P. C.), published May 25, 1943.

Certificate of Correction

Patent No. 2,526,675    October 24, 1950

GEORGE B. LITCHFORD

It is hereby certified that error appears in the printed specification of the above numbered patent requiring correction as follows:

Column 4, lines 4 and 5, for the word "rejection" read *reflection*; column 6, line 24, for "lowed" read *lower*; column 9, line 11, strike out "directive"; and that the said Letters Patent should be read as corrected above, so that the same may conform to the record of the case in the Patent Office.

Signed and sealed this 19th day of June, A. D. 1951.

[SEAL]

THOMAS F. MURPHY,
*Assistant Commissioner of Patents.*